US012759570B2

(12) United States Patent
Mayser

(10) Patent No.: US 12,759,570 B2
(45) Date of Patent: Oct. 13, 2026

(54) METHOD AND DEVICE FOR OPERATING A CRUISE CONTROL SYSTEM

(71) Applicant: Bayerische Motoren Werke Aktiengesellschaft, Munich (DE)

(72) Inventor: Christoph Mayser, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 366 days.

(21) Appl. No.: 18/685,967

(22) PCT Filed: Aug. 29, 2022

(86) PCT No.: PCT/EP2022/073869

§ 371 (c)(1),
(2) Date: Feb. 23, 2024

(87) PCT Pub. No.: WO2023/036634

PCT Pub. Date: Mar. 16, 2023

(65) Prior Publication Data

US 2026/0152198 A1 Jun. 4, 2026

(30) Foreign Application Priority Data

Sep. 8, 2021 (DE) ..................... 10 2021 123 233.3

(51) Int. Cl.
*B60W 50/10* (2012.01)
*B60W 30/16* (2020.01)
*B60W 30/18* (2012.01)

(52) U.S. Cl.
CPC ............ *B60W 50/10* (2013.01); *B60W 30/16* (2013.01); *B60W 30/18145* (2013.01);
(Continued)

(58) Field of Classification Search
CPC .... B60W 50/10; B60W 50/087; B60W 30/16; B60W 30/18145; B60W 30/18154;
(Continued)

(56) References Cited

U.S. PATENT DOCUMENTS

2007/0215401 A1 9/2007 Braeuchle et al.
2008/0300766 A1* 12/2008 Kumabe ......... B60W 30/18145 701/98
(Continued)

FOREIGN PATENT DOCUMENTS

DE 103 60 777 A1 7/2005
DE 10 2006 015 491 A1 10/2007
(Continued)

OTHER PUBLICATIONS

International Search Report (PCT/ISA/210) issued in PCT Application No. PCT/EP2022/073869 dated Dec. 20, 2022 with English translation (6 pages).
(Continued)

*Primary Examiner* — Aaron L Troost
(74) *Attorney, Agent, or Firm* — Crowell & Moring LLP

(57) ABSTRACT

A device for controlling a cruise control system of a vehicle, the device being designed to detect manual actuation of a brake of the vehicle while the cruise control system is active, and to determine whether the manual actuation of the brake should be interpreted as a switch-off request for deactivation of the cruise control system or not. Furthermore, the device is designed to deactivate or continue the cruise control system in accordance with the determination.

17 Claims, 2 Drawing Sheets

(52) U.S. Cl.
CPC ... *B60W 30/18154* (2013.01); *B60W 2540/12* (2013.01); *B60W 2552/30* (2020.02); *B60W 2554/4041* (2020.02); *B60W 2720/10* (2013.01)

(58) Field of Classification Search
CPC ......... B60W 2540/12; B60W 2552/30; B60W 2554/4041; B60W 2720/10
See application file for complete search history.

(56) References Cited

U.S. PATENT DOCUMENTS

| | | | | |
|---|---|---|---|---|
| 2012/0253629 | A1* | 10/2012 | Maruyama | G08G 1/22<br>701/96 |
| 2017/0043778 | A1* | 2/2017 | Kelly | B60W 30/143 |
| 2021/0188323 | A1 | 6/2021 | Kohlhuber | |

FOREIGN PATENT DOCUMENTS

| | | | | | |
|---|---|---|---|---|---|
| DE | 10 2013 226 004 | A1 | | 6/2014 | |
| DE | 102014208185 | A1 | * | 11/2015 | B60W 50/12 |
| DE | 10 2019 207 327 | B3 | | 9/2020 | |
| DE | 10 2019 130 919 | A1 | | 5/2021 | |
| JP | 11059221 | A | * | 3/1993 | |
| WO | WO 2015/165759 | A1 | | 11/2015 | |
| WO | WO 2019/215051 | A1 | | 11/2019 | |
| WO | WO 2021/089134 | A1 | | 5/2021 | |

OTHER PUBLICATIONS

German-language Written Opinion (PCT/ISA/237) issued in PCT Application No. PCT/EP2022/073869 dated Dec. 20, 2022 with English translation (11 pages).

German-language Search Report issued in German Application No. 10 2021 123 233.3 dated May 9, 2022 with partial English translation (14 pages).

* cited by examiner

METHOD AND DEVICE FOR OPERATING A CRUISE CONTROL SYSTEM

BACKGROUND AND SUMMARY

This disclosure relates to a method and a corresponding device for operating a cruise controller of a vehicle.

A vehicle may have one or more driver assistance systems which are designed to assist the driver of the vehicle with the longitudinal and/or lateral guidance of the vehicle. In particular, the vehicle may comprise a cruise controller which is configured to adjust, in particular control, the longitudinal speed of the vehicle on the basis of a set speed. In this case, the distance to a leading vehicle driving directly in front of the vehicle may possibly also be considered and, if appropriate, adjusted, in particular controlled, to a particular set distance.

If the driver of the vehicle causes a manual braking intervention during operation of the cruise control system by actuating the brake pedal, this typically results in the deactivation of the cruise control system. The system no longer intervenes in a controlling manner after deactivation. The vehicle then behaves as if the driver has removed his foot from the gas pedal when driving without an assistance system, and the vehicle then coasts. Furthermore, the cruise control system must typically be reactivated by the driver. This can be perceived as inconvenient or uncomfortable by the driver of the vehicle.

The present document deals with the technical object of safely increasing the convenience or comfort of a cruise control system.

One aspect of the present disclosure describes a device for controlling and/or operating a cruise control system of a (motor) vehicle. The cruise control system may be designed to adjust, in particular control, the driving speed of the vehicle on the basis of a particular target speed. The target speed for the cruise controller can depend on a set speed (typically stipulated by the driver of the vehicle). In particular, the target speed can correspond to the set speed (in the case of free travel without a leading vehicle).

The cruise control system may also be configured to automatically reduce the target speed for the cruise controller if necessary (so as to differ from the set speed). For example, the target speed can be automatically reduced by the cruise control system for cornering and/or a turn-off situation (in order to enable comfortable cornering and/or a comfortable turn-off process).

A further example of the target speed differing from the set speed is a combination of cruise control with distance control, wherein distance control is effected on the basis of a set distance (stipulated by the driver) to a leading vehicle driving directly in front of the vehicle. The target speed of the cruise controller can then be adapted, in particular reduced in comparison with the set speed, in such a manner that the distance between the vehicle and the leading vehicle is adjusted, in particular controlled, to the set distance.

The device is configured to detect that a brake of the vehicle is manually actuated while the cruise control system is active (that is to say, in particular while the driving speed of the vehicle is automatically adjusted, in particular controlled, by the cruise control system (according to a target speed)). In particular, it can be identified that the driver of the vehicle actuates a braking operating element, in particular a brake pedal, of the vehicle for the purpose of manually actuating the brake. Furthermore, it may be possible to determine, if necessary, actuation information relating to the actuation of the braking operating element, for example, the deflection of the braking operating element and/or the intensity, the speed, and/or the change gradient with which the braking operating element is actuated.

Furthermore, the device is configured to determine whether or not the manual actuation of the brake should be interpreted as a switch-off request for deactivating the cruise control system. For this purpose, the device may be configured to determine environmental data from one or more environmental sensors (for example a camera, a radar sensor, a lidar sensor, an ultrasonic sensor, etc.) of the vehicle. Alternatively, or additionally, it is possible to determine and/or use map data relating to the road network used by the vehicle (wherein the map data may indicate the course of the roads and/or the position of junctions between the roads). The environmental data and the map data may be evaluated in combination. In particular, the environmental data can be evaluated by incorporating the map data. Alternatively, or additionally, the device may be configured to determine actuation information relating to the actuation of the braking operating element that is effected by the driver of the vehicle. It is then possible to determine, in a precise and robust manner, on the basis of the environmental data, the map data, and/or the actuation information, whether or not the manual actuation of the brake should be interpreted as a switch-off request for deactivating the cruise control system.

The device may be configured, for example, to identify an upcoming stopping position (in particular a stop line) for the vehicle at a junction between a plurality of roads (in particular in response to the detected manual actuation of the brake). The stopping position can be identified on the basis of the environmental data and/or the map data. It is then possible to reliably determine, on the basis of the identified stopping position, that the manual actuation of the brake should not be interpreted as a switch-off request for deactivating the cruise control system (because it is an upcoming turn-off situation).

Alternatively, or additionally, the device may be configured to identify (on the basis of the environmental data and/or the map data) a bend in the road used by the vehicle (in particular in response to the detected manual actuation of the brake). It is then possible to reliably determine, on the basis of the identified bend, that the manual actuation of the brake should not be interpreted as a switch-off request for deactivating the cruise control system (because it is cornering).

Alternatively, or additionally, the device may be configured to identify (on the basis of the environmental data) that another vehicle ahead of the vehicle has moved into the lane used by the vehicle, with the result that the distance between the vehicle and the other vehicle (that is to say the vehicle moving in) is less than the set distance. This can be identified, in particular, in response to the detected manual actuation of the brake. Furthermore, this can possibly be identified in response to distance control with respect to another leading vehicle being carried out directly in front of the identified vehicle moving in. It is then possible to reliably determine, on the basis of the identified vehicle moving in, that the manual actuation of the brake should not be interpreted as a switch-off request for deactivating the cruise control system (because it is a situation in which a vehicle moves in).

Furthermore, the device is configured to deactivate or continue the cruise control system on the basis of the determination. The device may be configured, in particular, to deactivate the cruise control system if it has been determined that the manual actuation of the brake should be interpreted as a switch-off request for deactivating the cruise control system. Alternatively, or additionally, the device may be configured to continue the cruise control system (in particular, taking into account the detected manual actuation of the brake) if it has been determined that the manual actuation of the brake should not be interpreted as a switch-off request for deactivating the cruise control system.

The device therefore makes it possible to avoid unwanted deactivation of the cruise control system. The convenience and comfort of the cruise control system can therefore be safely increased.

The device may be configured to determine whether the cruise control system is operated at a target speed, which is less than the set speed of the cruise control system as stipulated by the user, in particular the driver, of the vehicle, at an actuation time at which the manual actuation of the brake is detected. It can therefore be determined whether the vehicle (for example, on account of a turn-off situation, and/or on account of cornering) is already automatically operated at a target speed which is below the set speed.

Furthermore, the device may be configured to determine, in particular to only determine, that the manual actuation of the brake should not be interpreted as a switch-off request for deactivating the cruise control system when it is determined that the target speed is less than the set speed at the actuation time. Deactivation of the cruise controller on account of the manual actuation of the brake can therefore be avoided, possibly only avoided, when the cruise controller has already automatically reduced the target speed of the vehicle (in comparison with the set speed). A turn-off situation and/or cornering can therefore be identified with particularly high reliability. In particular, the safety of the cruise control system can therefore be increased further.

The device may be configured to reduce the target speed used by the cruise control system, in particular, on the basis of the actuation information relating to the actuation of the braking operating element of the vehicle, which is effected by the driver of the vehicle, if it has been determined that the manual actuation of the brake should not be interpreted as a switch-off request for deactivating the cruise control system. The cruise control system can then be continued at the reduced target speed. The comfort of the cruise control system can therefore be increased in a particularly safe manner.

The device may be configured to reduce the target speed of the cruise control system to zero in order to transfer the vehicle to a standstill state on account of the detected manual actuation of the brake. The target speed of the cruise control system can be reduced to zero, in particular, in order to cause the vehicle to be put into the standstill state at an identified upcoming stopping position. The vehicle may be stationary in the standstill state and the cruise control system can be in an active standby mode (for example, with a target speed of zero). In the active standby mode, the vehicle can be kept at a standstill, for example, by actively controlling the brake of the vehicle. A particularly comfortable and safe turn-off process can therefore be enabled using the cruise control system.

Furthermore, the device may be configured to keep the vehicle in the standstill state until a start-up request from the driver of the vehicle is identified. Furthermore, the device may be configured to identify a start-up request from the driver. This can be identified, for example, on the basis of actuation of a resume operating element (for instance a button) of the cruise control system and/or on the basis of actuation of a driving operating element, in particular, an accelerator pedal, of the vehicle. The vehicle can then be (automatically) accelerated starting from the standstill state in response to the identified start-up request, in particular, in order to continue the cruise control system at the set speed stipulated by the driver, even before the detected manual actuation of the brake. It is thus possible to further increase the convenience and comfort of the cruise control system in a turn-off situation.

As already explained above, the device may be configured to identify a bend in the road used by the vehicle. The target speed of the cruise control system can then be reduced for travel through the identified bend on the basis of the deflection of the braking operating element of the vehicle. In particular, the device may be configured to reduce the target speed of the cruise control system in a temporally and/or spatially limited manner for travel through the identified bend on the basis of the deflection of the braking operating element of the vehicle. Comfortable “manual concomitant braking” can therefore be made possible for the driver of the vehicle during cornering.

The device may also be configured to increase the target speed of the cruise control system after traveling through the identified bend according to the set speed stipulated by the driver, even before the detected manual actuation of the brake. It is thus possible to further increase the convenience and comfort of the cruise control system during cornering.

The device may be configured to identify, in particular, in response to the detected manual actuation of the brake, that another vehicle (that is to say a vehicle moving in) ahead of the vehicle has moved into the lane used by the vehicle, with the result that the distance between the vehicle and the other vehicle is less than the set distance (for distance control). It is therefore possible to identify a situation in which a vehicle moves in (on the basis of the environmental data).

The target speed of the cruise control system can then be automatically reduced on the basis of the deflection of the braking operating element of the vehicle, in particular, until the distance between the vehicle and the other vehicle is equal to the set distance. The target speed can then be automatically stipulated again by the combined cruise and distance control. Comfortable “manual concomitant braking” can therefore be made possible for the driver of the vehicle during a situation in which a vehicle moves in.

A further aspect describes a further device for controlling a cruise control system of a vehicle. The features described in this document in connection with a device can also be used individually and/or in combination for this further device.

The device is configured to detect that a brake of the vehicle is manually actuated while the cruise control system is active. In particular, the actuation of the braking operating element of the vehicle can be identified.

The device is also configured to identify an upcoming stopping position for the vehicle at a junction. The target speed of the cruise control system can be reduced in response thereto in order to cause the vehicle to be put into a standstill state at the upcoming stopping position and to be kept in the standstill state. The vehicle may be stationary in the standstill state. Furthermore, the cruise controller (in standby) may continue to be active (for example, with a target speed of zero).

The device may also be configured to identify a start-up request from the driver of the vehicle. The vehicle can then be (automatically) accelerated starting from the standstill state in response to the identified start-up request, in particular, in order to continue the cruise control system at the set speed stipulated by the driver, even before the detected manual actuation of the brake.

Comfortable and safe operation of the cruise control system can therefore be enabled (in particular in a turn-off situation).

A further aspect describes a further device for controlling a cruise control system of a vehicle. The features described in this document in connection with a device can also be used individually and/or in combination for this device.

The device is configured to detect that a brake of the vehicle is manually actuated while the cruise control system is active. Furthermore, the device may be configured to identify a bend (that is, coming up or is currently traveled through) in the road used by the vehicle. The target speed of the cruise control system can then be reduced on the basis of actuation information relating to the actuation of the braking operating element of the vehicle, which is effected by the driver of the vehicle, during manual actuation of the brake. Comfortable and safe operation of the cruise control system can therefore be enabled (in particular during cornering).

A further aspect describes a further device for controlling a cruise control system of a vehicle. The features described in this document in connection with a device can also be used individually and/or in combination for this further device.

The device is configured to detect that a brake of the vehicle is manually actuated while the cruise control system is active. The device is also configured to identify that another vehicle ahead of the vehicle has moved into the lane used by the vehicle, with the result distance between the vehicle and the other vehicle is less than the set distance. The device is also configured to reduce the target speed of the cruise control system on the basis of actuation information relating to the actuation of the braking operating element of the vehicle, which is effected by the driver of the vehicle, during manual actuation of the brake.

A further aspect describes a (road) motor vehicle (in particular, an automobile or a truck, or a bus, or a motorcycle) which comprises at least one of the devices described in this document.

One aspect describes a method for controlling a cruise control system of a vehicle. The method comprises detecting that a brake of the vehicle is manually actuated while the cruise control system is active. The method also comprises determining whether or not the manual actuation of the brake should be interpreted as a switch-off request for deactivating the cruise control system. The method also comprises deactivating or continuing the cruise control system on the basis of the determination.

A further aspect describes a respective corresponding method for each individual device described.

A further aspect describes a software (SW) program. The SW program may be configured to be executed on a processor (for example, on a control unit of a vehicle) and to thereby carry out at least one of the methods described in this document.

A further aspect describes a storage medium. The storage medium may comprise a SW program which is configured to be executed on a processor and to thereby carry out at least one of the methods described in this document.

It should be noted that the methods, devices, and systems described in this document can be used both alone and in combination with other methods, devices, and systems described in this document. Furthermore, any aspects of the methods, devices, and systems described in this document can be combined with one another in various ways. In particular, the features of the claims can be combined with one another in various ways. Furthermore, features cited in brackets should be understood as optional features.

DETAILED DESCRIPTION OF THE DRAWINGS

Figure 1A:
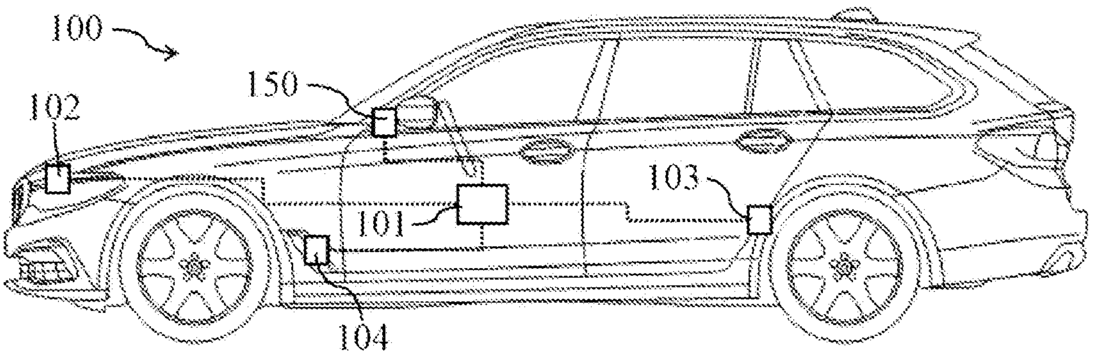
FIG. 1*a* shows exemplary components of a vehicle.

As explained at the outset, the present document deals with safely increasing the convenience and comfort of a cruise control system. In this context, FIG. 1*a* shows exemplary components of a vehicle 100. The vehicle 100 comprises one or more environmental sensors 102 (for example, a camera, a radar sensor, a lidar sensor, an ultrasonic sensor, etc.) which are configured to capture environmental data (that is to say, sensor data) relating to the environment of the vehicle 100.

The vehicle 100 also comprises a (control) device 101, implemented by the aforementioned processor and/or SW program, which is configured to evaluate the environmental data in order to provide a driver assistance function, in particular, a cruise control function. For example, the actual distance to the leading vehicle driving directly in front of the vehicle 100 can be determined on the basis of the environmental data. The driving speed of the vehicle 100 can then be adapted on the basis of the determined actual distance, for example, in order to control the actual distance to a particular set distance. For this purpose, the device 101 can control one or more longitudinal and/or lateral guidance actuators 103 of the vehicle 100 (for example, a drive motor, a steering actuator, and/or a brake actuator).

The vehicle 100 comprises a user interface 150 which makes it possible for the user, in particular, the driver, of the vehicle 100 to interact with the vehicle 100. In particular, it may be possible for the user to activate or deactivate a cruise control function (that is to say, a cruise control system). Furthermore, it may be possible for the user to stipulate a set speed and/or a set distance.

Figure 1B:
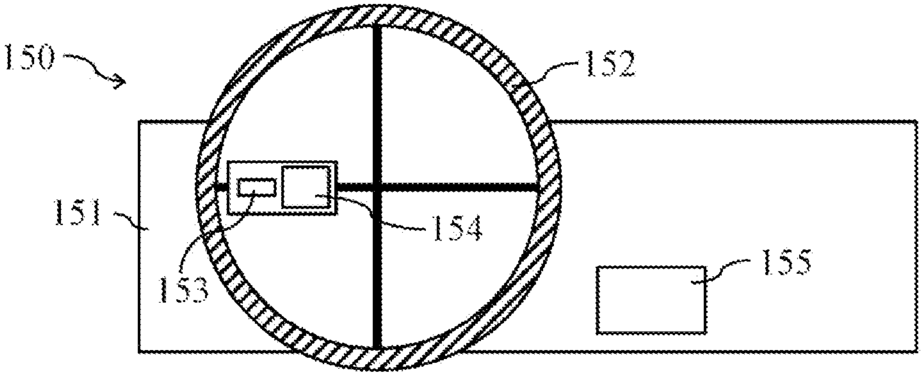
FIG. 1*b* shows an exemplary user interface of a vehicle.

FIG. 1*b* shows exemplary components of a user interface 150. The user interface 150 may be arranged on the dashboard 151, in particular on the steering means 152 (for instance, the steering wheel), of the vehicle 100. The user interface 150 may comprise, for example, an activation and/or deactivation operating element 155 which can be actuated by the user in order to activate or deactivate the cruise control system. Furthermore, the user interface 150 may comprise, for example on the steering means 152, an input operating element 154 (for example, in the form of a button or rocker switch) which makes it possible for the user to stipulate (for example, increase or reduce) the set speed and/or the set distance. The user interface 150 may also comprise, for example, on the steering means 152, a resume operating element 153 (for example, button or switch) which makes it possible for the user to reactivate the cruise control system from a standby state (without the set speed and/or the set distance having to be newly stipulated for this purpose). Actuating the resume operating element 153 may make it possible for the user to continue to operate the cruise control system at the previously stipulated and/or stored set speed.

The vehicle 100 may therefore comprise a cruise control system (with the device 101) which is designed to automatically longitudinally guide the vehicle 100 on the basis of a set speed and/or on the basis of a set distance.

The vehicle 100 also comprises a braking operating element 104, in particular, a brake pedal, which makes it possible for the user, in particular, the driver, of the vehicle 100 to manually actuate one or more brakes, in particular, wheel brakes, of the vehicle 100, and therefore to manually effect deceleration and/or a deceleration torque of the vehicle 100. The actuation of the braking operating element 104 typically results in termination, in particular, deactivation, of the cruise control system. As a result, the longitudinal guidance of the vehicle 100 must be typically provided in a completely manual manner by the driver of the vehicle 100. Furthermore, during reactivation of the cruise control system, it may possibly be necessary for the set speed of the cruise control system to have to be newly stipulated. Alternatively, the cruise control system may be designed to note the set speed applicable before deactivation (and to reuse it when the cruise control system is reactivated).

The complete termination of the cruise control system and the resulting requirement to reactivate the cruise control system can be perceived as inconvenient and/or uncomfortable by the driver of the vehicle 100, in particular, in connection with a turn-off situation and/or during cornering.

Figure 2:
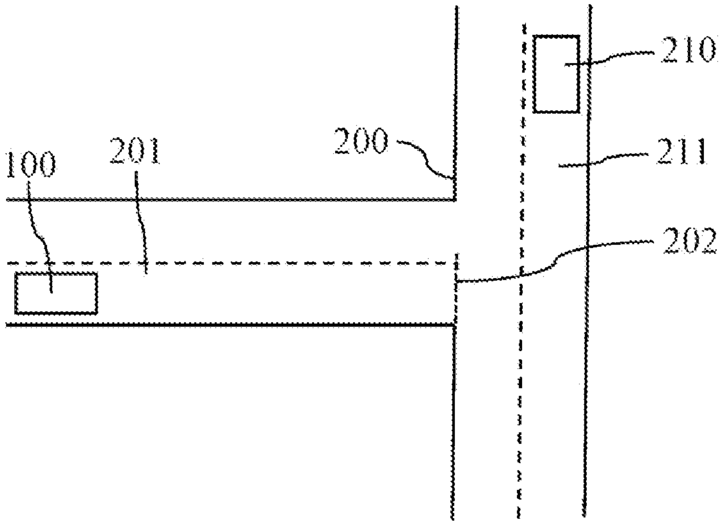
FIG. 2 shows an exemplary driving situation at a traffic junction.

FIG. 2 shows an exemplary driving situation of the vehicle 100 at a traffic junction 200 (for instance, at an intersection or an on-ramp). The vehicle 100 drives toward the junction 200 on an approach road 201. At the junction 200, the approach road 201 meets another road 211, onto which the driver of the vehicle 100 might possibly like to turn, or which the driver of the vehicle 100 might possibly like to cross. The approach road 201 has a stopping position 202, in particular, a stop line, at which the vehicle 100 must possibly stop in order to give priority to another vehicle 210 on the other road 211.

The vehicle 100 may drive toward the junction 200 on the approach road 201 with the cruise control system activated. The device 101 of the vehicle 100 may identify that the driver of the vehicle 100 has actuated the braking operating element 104. The device 101 may also be designed to check whether there is a driving situation in which the actuation of the braking operating element 104 should not be interpreted as a switch-off request for switching off the cruise control system. For this purpose, the device 101 may analyze, for example:

- the environmental data from the one or more environmental sensors 102, for example, in order to identify that the vehicle 100 is moving toward a junction 200, and/or in order to identify the stopping position 202 at the junction 200; and/or,
- map data relating to the road network used by the vehicle 100, in which, for example, the position of the junction 200 and possibly the stopping position 202 are indicated. The map data may be evaluated in conjunction with position data (for example GNSS coordinates) relating to the current position of the vehicle 100.

If the device 101 determines that there is a driving situation in which the actuation of the braking operating element 104 should be interpreted as a switch-off request for switching off the cruise control system, the cruise control system can be switched off and/or deactivated. The longitudinal guidance of the vehicle 100 should then be typically effected in a completely manual manner by the driver of the vehicle 100.

If, on the other hand, it is determined that there is a driving situation in which the actuation of the braking operating element 104 should not be interpreted as a switch-off request for switching off the cruise control system, the cruise control system can be continued, taking into account the identified actuation of the braking operating element 104. In particular, the automated longitudinal guidance of the vehicle 100 may be continued, taking into account the identified actuation of the braking operating element 104.

If, for example, a stopping position 202 is identified for the vehicle 100 at a junction 200, the actuation of the braking operating element 104 can be interpreted as a request from the driver to automatically transfer the vehicle 100 to a standstill state at the stopping position 201. For this purpose, the brake actuator 103 of the vehicle 100 may possibly be controlled in order to automatically brake the vehicle 100 (without the driver still having to actuate the braking operating element 104 for this purpose). Automated braking to a standstill can therefore be effected on account of (possibly brief) actuation of the braking operating element 104. The vehicle 100 can then be automatically kept in the standstill state (at the stop line 202).

Starting from the standstill state, the active cruise control of the vehicle 100 can be resumed by the driver, in particular, by actuating the resume operating element 153 and/or by actuating a driving operating element, in particular, the accelerator pedal, of the vehicle 100 (not illustrated). In particular, it may be possible for the driver of the vehicle 100 to actuate the accelerator pedal of the vehicle 100 (for a relatively short time). The vehicle 100 can then be automatically longitudinally guided on the basis of the stored set speed and/or on the basis of the stored set distance in response to the actuation of the driving operating element and/or the resume operating element 153. The turn-off process (that is to say, the lateral guidance of the vehicle 100) can be manually effected by the driver.

The vehicle 100 can therefore be automatically transferred to a standstill state via (pulse-like or brief) actuation of the braking operating element 104, without terminating the cruise control system. The convenience and comfort for the driver of the vehicle 100 can therefore be increased.

Figure 3:
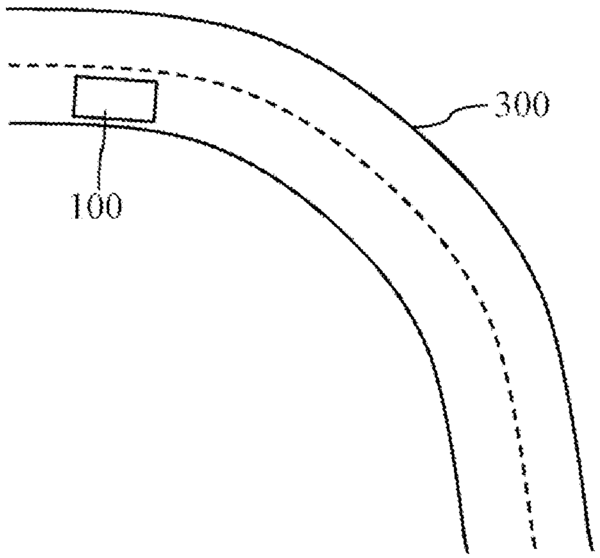
FIG. 3 shows an exemplary driving situation on a bend.

FIG. 3 shows a driving situation in which the vehicle 100 is traveling on a bend 300. The device 101 of the vehicle 100 may be configured to identify a bend 300 (that is coming up and/or is currently being traveled through) (for example, on the basis of the environmental data and/or on the basis of the map data). Furthermore, the device 101 may be configured to automatically reduce the driving speed of the vehicle 100 (to a value below the set speed) for travel along the bend 300. In particular, the target speed of the cruise control system can be adjusted to a value below the set speed on the basis of the bend radius of the bend 300.

The device 101 may also be configured to check, in response to identified actuation of the braking operating element 104, whether there is a driving situation in which the actuation of the braking operating element 104 should not be interpreted as a switch-off request for switching off the cruise control system. For this purpose, it is possible to take into account, for example:

- the deflection of the braking operating element 104 during the identified actuation of the braking operating element 104;
- the strength and/or the (operating) speed and/or the gradient with which the braking operating element 104 has been actuated; and/or,
- the presence of a bend 300 and/or the bend radius of the bend 300.

If it is determined that there is a driving situation in which the actuation of the braking operating element 104 should not be interpreted as a switch-off request for switching off the cruise control system (and there is also no stopping position 202 for transferring the vehicle 100 to the standstill state), the actuation of the braking operating element 104 can be used to adapt, in particular reduce, the set speed and/or the target speed of the cruise control system. In this case, the set speed and/or the target speed can be adapted on the basis of the deflection of the braking operating element 104.

It may therefore be possible for the driver of the vehicle 100 (in particular, during cornering) to at least partially manually brake the vehicle 100 by actuating the braking operating element 104, without this resulting in termination of the cruise control system. Rather, the actuation of the braking operating element 104 by the driver can be used to comfortably reduce the target speed of the cruise control system (possibly, in a manner temporally limited to the cornering). After the cornering, the (previously stored) set speed can then possibly be used again to adjust the driving speed of the vehicle 100.

The cruise control system can therefore be designed to incorporate bends 300 and/or turn-off situations in the cruise control, for example, in order to (temporarily) automatically reduce the speed of the vehicle 100 to a comfortable turn-off speed. This speed is usually below the set speed in turn-off situations.

In situations in which the cruise control system decelerates to a speed below the (possibly minimum) set speed, the safe state "vehicle stationary" (that is to say, the standstill state) can be assumed upon actuation of the brake pedal 104, without the cruise control system having to be deactivated. In this state, automatic start-up (that is to say, system-initiated start-up) can then be confirmed by the driver (for example, by actuating the resume operating element 153 and/or by actuating the accelerator pedal).

This makes it possible to eliminate deactivation of the cruise control system in many situations upon actuation of the brake pedal, and the driver has the opportunity, in particular, in the speed range below the (minimum) set speed, to override the cruise control system using the brake pedal 104. The convenience and comfort for the driver can therefore be increased.

A further example of a driving situation in which the manual actuation of the brake pedal 104 should possibly not result in deactivation of the cruise control system is a situation in which a vehicle moves in. In this case, the vehicle 100 may follow a leading vehicle in a particular lane with a predefined set distance. The cruise control system may therefore be additionally designed to carry out distance control.

From the adjacent lane, a further vehicle may possibly move into the gap between the vehicle 100 and the leading vehicle. This other vehicle may be referred to as a vehicle moving in. The moving-in of the other vehicle results in the set distance possibly being considerably undershot in the meantime. The cruise control system can then reduce the target speed for adjusting the driving speed of the vehicle 100. However, the automatic reduction in the target speed may possibly be perceived as insufficient and/or too late by the driver of the vehicle 100.

This may result in the driver actuating the braking operating element 104 in order to effect manual braking. In a similar manner to that during cornering, this manual actuation of the brake can be interpreted as "concomitant braking" by the driver. As a result, the target speed of the cruise controller may possibly be additionally reduced (on the basis of the actuation information relating to the actuation of the braking operating element 104). It is thus possible to cause the distance to the vehicle moving in to be built up more quickly. Deactivation of the cruise control system can be prevented. The target speed can then be completely adjusted by the cruise control system again (without taking into account the manual actuation of the brake) as soon as the distance to the vehicle moving in corresponds to the set distance.

Figure 4:
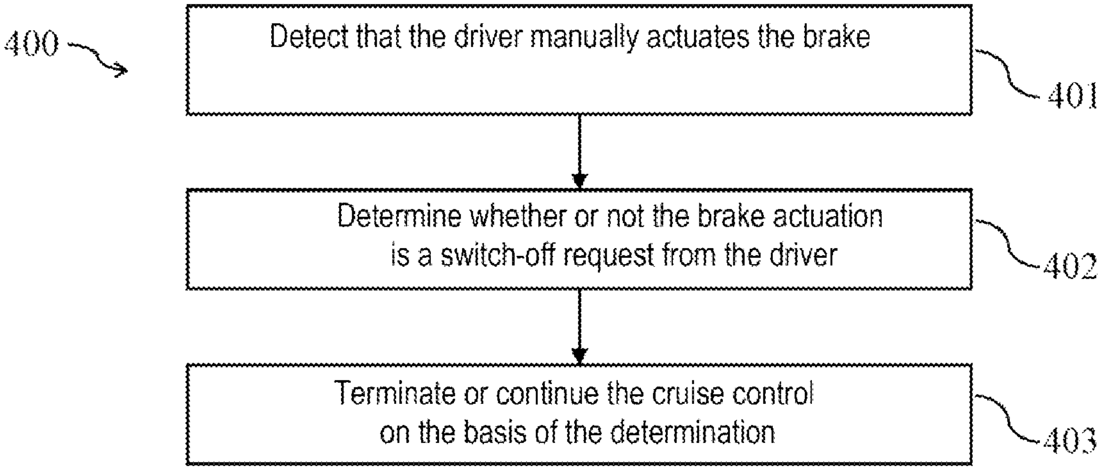
FIG. 4 shows a flowchart of an exemplary method for operating a cruise control system on account of manual brake actuation.

FIG. 4 shows a flowchart of a (possibly computer-implemented) method 400 for controlling a cruise control system of a (motor) vehicle 100. The method 400 can be carried out by a (control) device 101 of the vehicle 100.

The method 400 comprises detecting 401 that a brake of the vehicle 100 is manually actuated while the cruise control system is active. In particular, it is possible to identify that the braking operating element 104, in particular, the brake pedal, of the vehicle 100 is manually actuated.

The method 400 also comprises determining 402 whether or not the manual actuation of the brake should be interpreted as a switch-off request for deactivating the cruise control system. For this purpose, it is possible to determine (for example, on the basis of the environmental data, on the basis of the map data, and/or on the basis of the actuation information relating to the actuation of the braking operating element 104) one or more indications that the manual actuation of the brake should be interpreted as a switch-off request, or should not be interpreted as a switch-off request for deactivating the cruise control system. An indication of the non-existence of a switch-off request is, for example, the travel of the vehicle 100 through a bend 300 (during which the target speed of the cruise control system is automatically set to a value that is less than the set speed). An alternative or additional indication of the non-existence of a switch-off request is a turn-off situation at a junction 200 (during which the vehicle 100 must possibly stop at a stopping position 202 before turning off). An alternative or additional indication of the non-existence of a switch-off request is a situation in which a vehicle moves in ahead of the vehicle 100 (in particular, when controlling the driving speed on the basis of a set distance).

The method 400 also comprises deactivating or continuing 403 the cruise control system on the basis of the determination 402. In particular, the cruise control system can be deactivated (with the result that a set speed must typically be stipulated again upon reactivation) if it is determined that the manual actuation of the brake should be interpreted as a switch-off request for deactivating the cruise control system. On the other hand, the cruise control system can be continued (at the already stipulated set speed) if it is determined that the manual actuation of the brake should not be interpreted as a switch-off request for deactivating the cruise control system. In this case, the target speed of the cruise control system can be (at least temporarily) automatically adapted (in particular reduced).

In this case, the target speed can be adapted on the basis of whether the target speed strived for by the cruise control system or the target speed strived for by the actuation of the braking operating element 104 by the driver is decisive. For example, the target speed may be adapted to the target speed strived for by the cruise control system or to the target speed strived for by the actuation of the braking operating element 104 by the driver depending on which of the two target speeds is the smaller of the two.

The convenience and comfort of the cruise control system can therefore be safely increased.

The present disclosure is not restricted to the exemplary embodiments shown. In particular, it should be noted that the description and the figures are intended to illustrate only by way of example the principle of the proposed methods, devices, and systems.

What is claimed is:

1. A control unit comprising a processor for controlling a cruise control system of a vehicle, wherein the control unit is configured to:

detect that a brake of the vehicle is manually actuated while the cruise control system is active;

determine whether or not the manual actuation of the brake should be interpreted as a switch-off request for deactivating the cruise control system; and, deactivate or continue the cruise control system on the basis of the determination;

identify a bend in a road used by the vehicle; and, determine on the basis of the identified bend that the manual actuation of the brake should not be interpreted as a switch-off request for deactivating the cruise control system.

2. The control unit according to claim 1, wherein the control unit is configured to determine whether or not the manual actuation of the brake should be interpreted as a switch-off request for deactivating the cruise control system, on the basis of:

environmental data from one or more environmental sensors of the vehicle;

map data relating to a road network used by the vehicle; and/or, actuation information relating to actuation of a braking operating element, in particular a brake pedal, of the vehicle for manually actuating the brake, which is effected by a driver of the vehicle.

3. The control unit according to claim 1, wherein the control unit is configured to:

determine whether the cruise control system is operated at a target speed, which is less than a set speed of the cruise control system that is stipulated by a user of the vehicle, at an actuation time at which the manual actuation of the brake is detected; and, determine that the manual actuation of the brake should not be interpreted as a switch-off request for deactivating the cruise control system when it is determined that the target speed is less than the set speed at the actuation time.

4. The control unit according to claim 1, wherein the control unit is configured to:

deactivate the cruise control system if it has been determined that the manual actuation of the brake should be interpreted as a switch-off request for deactivating the cruise control system; and, continue the cruise control system, taking into account the detected manual actuation of the brake, if it has been determined that the manual actuation of the brake should not be interpreted as a switch-off request for deactivating the cruise control system.

5. The control unit according to claim 1, wherein the control unit is configured to:

reduce a target speed used by the cruise control system, in particular on the basis of actuation information relating to actuation of a braking operating element of the vehicle, which is effected by a driver of the vehicle, during manual actuation of the brake if it has been determined that the manual actuation of the brake should not be interpreted as a switch-off request for deactivating the cruise control system.

6. The control unit according to claim 5, wherein the control unit is configured to:

reduce the target speed of the cruise control system to zero in order to transfer the vehicle to a standstill state on account of the detected manual actuation of the brake; and, keep the vehicle in particular in the standstill state until a start-up request from the driver of the vehicle is identified.

7. The control unit according to claim 6, wherein the control unit is configured to:

identify a start-up request from the driver, in particular on the basis of actuation of a resume operating element of the cruise control system and/or on the basis of actuation of a driving operating element, in particular an accelerator pedal, of the vehicle; and, accelerate the vehicle starting from the standstill state in response to the identified start-up request in order to continue the cruise control system at a set speed stipulated by the driver even before the detected manual actuation of the brake.

8. The control unit according to claim 5, wherein the control unit is configured to:

identify an upcoming stopping position for the vehicle, in particular in response to the detected manual actuation of the brake; and, reduce the target speed of the cruise control system to zero in order to cause the vehicle to be put into the standstill state at the upcoming stopping position.

9. The control unit according to claim 5, wherein the control unit is configured to:

identify a bend in a road used by the vehicle, in particular in response to the detected manual actuation of the brake; and, reduce the target speed of the cruise control system for travel through the identified bend on the basis of a deflection of the braking operating element of the vehicle.

10. The control unit according to claim 9, wherein the control unit is configured to:

reduce the target speed of the cruise control system in a temporally and/or spatially limited manner for travel through the identified bend on the basis of the deflection of the braking operating element of the vehicle; and, increase the target speed of the cruise control system after driving through the identified bend according to a set speed stipulated by the driver, even before the detected manual actuation of the brake.

11. The control unit according to claim 5, wherein the control unit is configured to:

identify, in particular in response to the detected manual actuation of the brake, that another vehicle ahead of the vehicle has moved into a lane used by the vehicle, with the result that a distance between the vehicle and the other vehicle is less than a set distance; and, reduce the target speed of the cruise control system on the basis of a deflection of the braking operating element of the vehicle, in particular until the distance between the vehicle and the other vehicle is equal to the set distance.

12. The control unit according to claim 1, wherein the control unit is configured to:

identify an upcoming stopping position for the vehicle at a junction of a plurality of roads, in particular in response to the detected manual actuation of the brake; and, determine on the basis thereof that the manual actuation of the brake should not be interpreted as a switch-off request for deactivating the cruise control system.

13. The control unit according to claim 1, wherein the control unit is configured to:

identify that another vehicle ahead of the vehicle has moved into a lane used by the vehicle, with the result that a distance between the vehicle and the other vehicle is less than a set distance; and, determine on the basis thereof that the manual actuation of the brake should not be interpreted as a switch-off request for deactivating the cruise control system.

14. The control unit according to claim 1, wherein the control unit is configured to identify the bend on the basis of environmental data from one or more environmental sensors of the vehicle and/or map data relating to a road network used by the vehicle.

15. The control unit according to claim 1, wherein the control unit is configured to automatically reduce a target speed of the cruise control system to a value below a set speed of the cruise control system for travel along the identified bend on the basis of a bend radius of the identified bend.

16. The control unit according to claim 1, wherein the control unit is configured to adapt a target speed of the cruise control system to a target speed strived for by the cruise control system or to a target speed strived for by actuation of a braking operating element by a driver of the vehicle depending on which of the two target speeds is smaller.

17. A control unit comprising a processor for controlling a cruise control system of a vehicle, wherein the control unit is configured to:

detect that a brake of the vehicle is manually actuated while the cruise control system is active;

identify an upcoming stopping position for the vehicle at a junction;

reduce a target speed of the cruise control system in response thereto in order to cause the vehicle to be put into a standstill state at the upcoming stopping position and to be kept in the standstill state;

identify a start-up request from a driver of the vehicle; and, accelerate the vehicle starting from the standstill state in response to the identified start-up request in order to continue the cruise control system at a set speed stipulated by the driver, even before the detected manual actuation of the brake, wherein in the standstill state, the cruise control system is in an active standby mode with a target speed of zero, and the vehicle is kept at a standstill by actively controlling a brake of the vehicle.

* * * * *